Dec. 21, 1943.  H. G. BECK  2,337,366
EYE RING CLINCHING MACHINE
Filed Feb. 28, 1941  6 Sheets-Sheet 3

INVENTOR
Howard G. Beck
BY Evans + McCoy
ATTORNEYS

Dec. 21, 1943.   H. G. BECK   2,337,366
EYE RING CLINCHING MACHINE
Filed Feb. 28, 1941   6 Sheets-Sheet 4

Fig.40

INVENTOR
Howard G. Beck
BY
Evans + McCoy
ATTORNEYS

Dec. 21, 1943.      H. G. BECK      2,337,366
EYE RING CLINCHING MACHINE
Filed Feb. 28, 1941      6 Sheets-Sheet 5

Fig.11      Fig.12

INVENTOR
*Howard G. Beck*
BY
*Evans + McCoy*
ATTORNEYS

Fig.13  Fig.14

INVENTOR
Howard G. Beck
BY Evans + McCoy
ATTORNEYS

Patented Dec. 21, 1943

2,337,366

UNITED STATES PATENT OFFICE 2,337,366

EYE RING CLINCHING MACHINE

Howard G. Beck, Wabash, Ind., assignor to The General Tire & Rubber Company, Akron, Ohio, a corporation of Ohio Application February 28, 1941, Serial No. 381,074

15 Claims. (Cl. 153—1)

This invention relates to clinching apparatus, and more particularly to an improved method of and apparatus for bending an eye ring around the edge of a lens.

In the manufacture of face masks, particularly those having an integral face blank formed of rubber, considerable difficulty is experienced in bending or shaping the metal rings that hold the lenses in place. Because of the elasticity and resilience of the rubber of the mask it has a tendency to stretch and bend as well as slip along the edge of the lens and, unless the assembly of the lenses, rubber mask and eye rings are held firmly together during the bending of the eye rings, displacement of the lens or the rubber mask or both is apt to occur.

One of the principal objects of the present invention is, therefore, to provide a generally improved method of and apparatus for holding a bendable eye ring, a lens, and a mask or the like in predetermined relatively fixed relationship to one another, and for bending one edge, or a series of tabs formed along one edge, of the eye ring around the mask and the edge of the lens while the latter is so held.

Another object is to provide a method of and an apparatus for bending one edge, or a series of tabs formed along one edge, of an eye ring over the edge of a lens simultaneously around the entire periphery of the latter.

Another object is to provide, in a machine for shaping an eye ring about a lens, a multiplicity of fingers disposed in a ring and movable to simultaneously engage and bend the ring to the desired shape. More specifically, it is an aim of the invention to provide a multiplicity of shaping or folding fingers disposed in a ring and mounted for pivotal movement to individually engage tabs or ears on an eye ring and bend such engaged tabs or ears inwardly simultaneously around the entire periphery of the ring.

Another object is to provide a clinching apparatus having means for clamping the lens or work and for moving with the clamped work against a holder which supports the clamped work during the clinching operation. The apparatus of the present invention includes numerous structural improvements such as means for retaining the work or lens in predetermined position relative to one of the clamping members until the work or lens is engaged and held by the other clamping member; means for guiding a face blank and an eye ring for movement to predetermined positions relative to one another and relative to a lens to be assembled therewith; means for actuating the movable parts of the clinching apparatus by fluid operated pistons; and control means for governing the operation of the actuating means, the control including an automatic starting device for initiating the clinching movement of folding fingers upon movement of a face mask or blank, an eye ring, and a lens into assembled position against a work holder. Other objects and advantages will become apparent from the following detailed description of the invention made in connection with the accompanying drawings, wherein:

Fig. 6 is a front view of a face mask having eye rings and lenses of the character assembled therewith by the machine illustrated in the preceding figures;

Fig. 7 is a plan view and Fig. 8 is a sectional view taken on the line 8—8 of Fig. 7 illustrating the type of sheet metal eye ring that is bendable or clinchable around the type of lens shown in plan view in Fig. 9 by means of the apparatus forming the subject matter of this invention, and with the rubber of the face mask or face blank disposed therebetween;

In the drawings illustrating a preferred embodiment of the invention, like numerals indicate like parts throughout the several figures.

Figures 1, 2, 3:
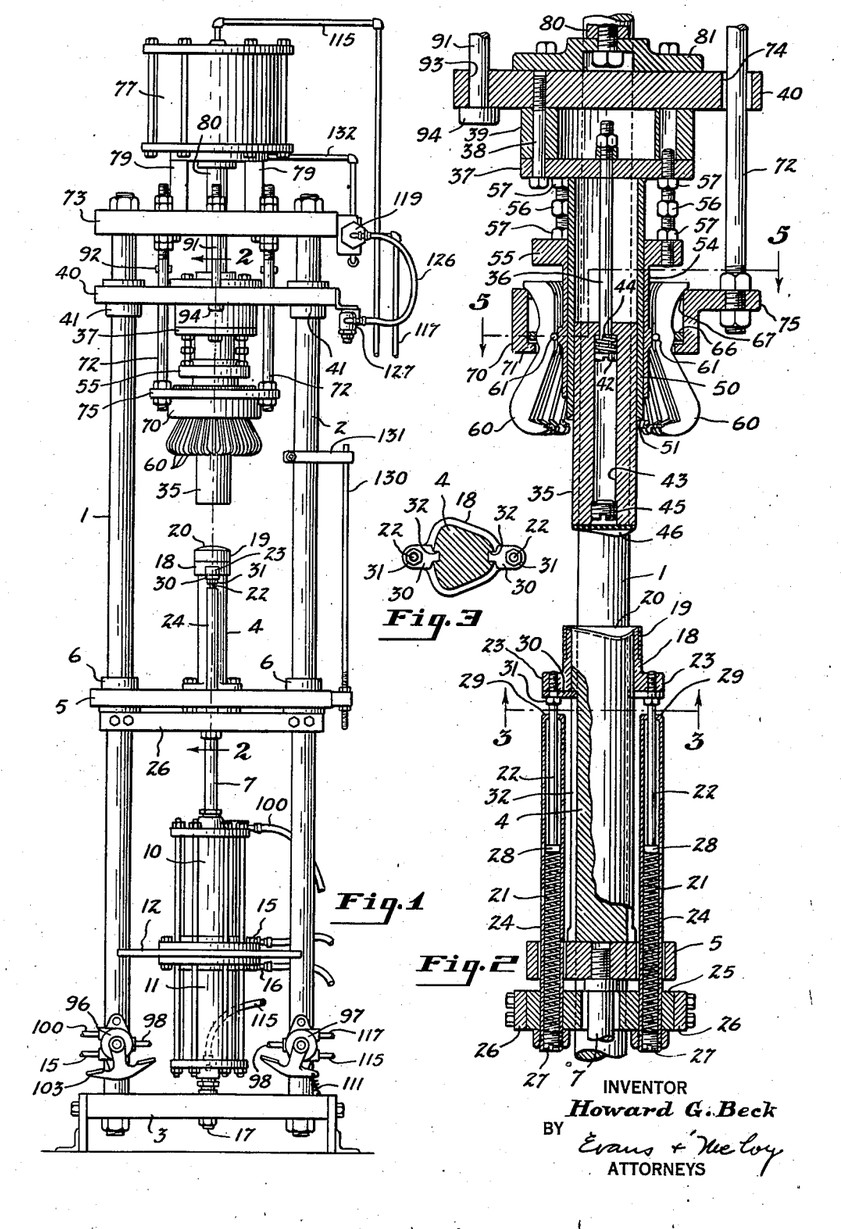
Figure 1 is an elevational view with parts removed, showing clinching apparatus embodying the present invention and with the parts thereof positioned to receive an eye ring, a mask, and a lens for assembly.
Fig. 2 is a sectional detail with parts removed, taken substantially on the line 2—2 of Fig. 1 and enlarged with respect thereto.
Fig. 3 is a sectional detail taken substantially on the line 3—3 of Fig. 2.

Referring to Fig. 1, the apparatus comprises a pair of supporting columns 1 and 2 disposed in spaced parallel upright positions and mounted on a base 3.

Disposed midway between the columns 1 and 2 is a first clamping member or ram 4 mounted on a cross member or slide 5 having sleeves 6 guided by the columns 1 and 2 so that the clamping member 4 may be reciprocated vertically by means of a piston rod 7 (Figs. 10 through 14) actuable by pistons 8 and 9. The piston 8 is slidable in a cylinder 10, while the piston 9 is slidable in a cylinder 11. These cylinders are disposed in end to end relation and abut against a common cross member or support 12 which is guided by the columns 1 and 2 and seals the ends of the cylinders. Introduction of air or other fluid under pressure into the lower end of the chamber within the cylinder 10 through a conduit or flexible tube 15 raises the piston 8, thereby elevating the first clamping member 4 to approximately the position shown in Fig. 12. Further vertical movement of the clamping member is effected by introducing air or other fluid under pressure into the upper end of the chamber within the cylinder 11 through a tubular flexible conductor 16. Secured to the piston 9 is a rod 17 which extends through the lower end of the cylinder 11 and is secured in the base 3. Thus, high pressure fluid in the upper end of the cylinder 11 raises both cylinders 10 and 11 guided by the cross member 12 and also raises the first clamping member 4 guided by the cross member 5 to approximately the position shown in Fig. 14, as will later appear.

The cross sectional shape of the clamping member 4, or at least the upper end thereof, preferably corresponds to the shape or contour of the lens to be assembled. In the illustrations (see Fig. 9) lens 135 is somewhat bell shaped in plan form and the corresponding cross sectional shape of the clamping member 4 is shown in Fig. 3.

Disposed about the clamping member is a lens retainer or locater comprising a sleeve 18 embracing and having a sliding fit over the first clamping member 4. A band 19 embraces a reduced section portion at the upper end of the sleeve 18, and is secured to the latter as by brazing or welding. The retainer band 19 is of such size and shape that the lens fits smoothly or snugly within the same while the upper or lens engaging face of the clamping member 4 is slightly smaller than the lens. Accordingly, when disposed against the upper end of the clamping member 4, the lens overlaps the clamping member by an amount corresponding to the thickness of the end of the sleeve 18, and the band 19 serves as a guide to position the lens in predetermined relation to the receiving surface of the clamping member 4. Preferably, such receiving surface comprises a sheet of relatively soft rubber, indicated at 20, Fig. 4, bonded to the metal clamping member.

A pair of helical compression springs 21 acting on rods 22 threaded into diametrically spaced ears 23 secured to the sleeve 18 serve to support the latter. The springs 21 are guided in tubes 24 secured in a block 25 supported by stationary cross members 26, the latter being attached to the columns 1 and 2 and serving as a stop to limit the downward movement of the cross member 5 which carries the first clamping member 4. The lower ends of the tubes 24 are closed by screw plugs 27, while the upper ends of the tubes have inturned flanges 29 engageable with heads or stops 28 on the rods 22 to limit the upward movement of the rods and the retainer sleeve 18.

Guides or lugs 30 held against the underside of the ears 23 by nuts 31 on the rods 22 ride in longitudinally extending grooves 32 formed in opposite sides of the first clamping member 4. Shoulders at the upper ends of the grooves 32 engage the guides 30 and serve as stops to limit or restrict the upward movement of the retainer sleeve 18 relative to the clamping member. The clamping member continues to move upwardly after the retainer 18 reaches its limit of movement, so that in the first operating position shown in Fig. 12, the upper end of the sleeve 18 is below the surface of the rubber 20 which supports a received lens.

Disposed between the columns 1 and 2, above and in axial alignment with the first clamping member 4, is a second elongated clamping member or ram 35 slidingly supported by a vertical rod 36 carried by a plate 37 attached by bolts 38 and a spacing collar or ring 39 to a vertically movable cross member 40 guided by sleeves 41 on the columns 1 and 2. Head 42 on the rod 36 is received in an axial bore or opening 43 within the second clamping member 35. Preferably, a compression spring 44 is interposed between the head 42 of the rod and the end of the passage 43 to serve as a resilient stop limiting the downward movement of the second clamping member. If desired, the axial bore 43 may be closed by a screw plug 45 and the bottom end or working face of the upper or second clamping member may be provided with a soft rubber cushion 46 bonded thereto to engage the upper surface of a lens presented by the upward movement of the lower or first clamping member 4.

Figure 5:
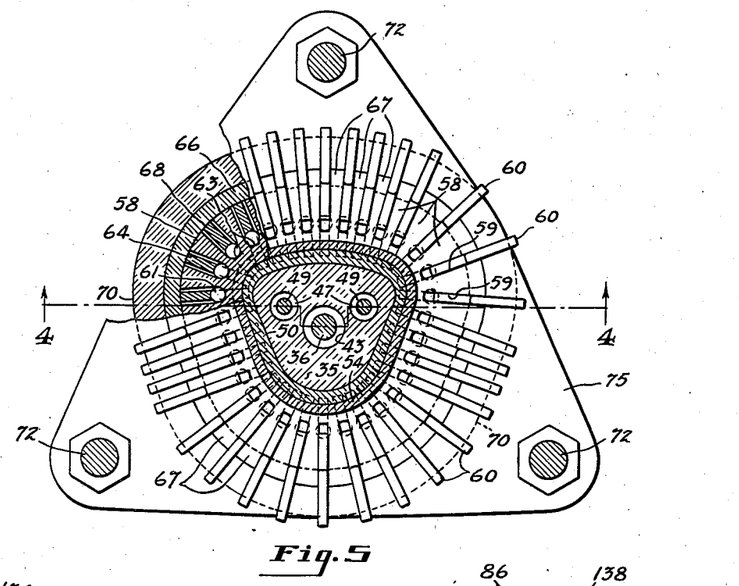
Fig. 5 is a horizontal sectional detail with parts broken away, taken substantially on the lines indicated at 5—5 of Fig. 2 and 5—5 of Fig. 4.
Figures 6, 7, 8, 9:
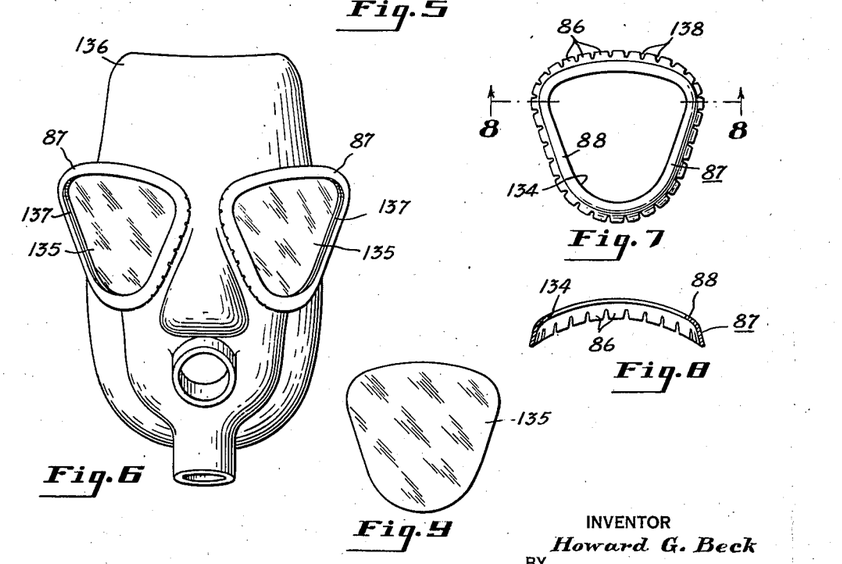
Figure 11:
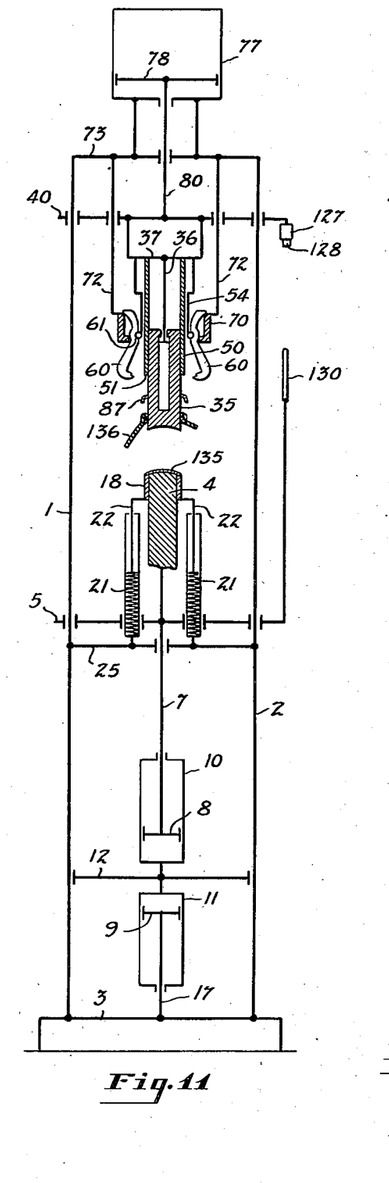
Figs. 11 through 14 are diagrammatic illustrations of the apparatus showing the same in different and progressive stages during the assembly of an eye ring with a lens and a face blank and during the clinching of the eye ring about the lens.

The cross sectional shape of the upper clamping member or ram 35, or at least the lower end thereof, preferably corresponds to the interior opening in the eye ring to fit within the latter. Fig. 5 shows the upper clamping member in cross section and Fig. 7 shows one of the eye rings. Accordingly, the eye ring, slightly springy to decrease one of its transverse dimensions, may be frictionally received on the dependent upper clamping member and supported thereby as shown in Fig. 11.

Upward movement of the second clamping member 35 relative to the plate 37 is resisted by a pair of helical compression springs 47 received in elongated openings or recesses 48 formed in the clamping member 35 in parallel relation to the axial opening 43. Guides or rods 49 are secured at their upper ends in the plate 37 and extend downwardly therefrom through the springs 47 and into the openings or bores 48 to guide and provide lateral support for the springs 47 when the clamping member 35 is lowered on the rod 36.

Disposed about the second ram or upper clamping member 35 in embracing relation thereto is a sleeve-like holder 50, the upper end of which is secured to the plate 37 as by welding. The lower end of this sleeve constitutes an eye ring support or anvil having a working face 51 which engages the upper surface of an eye ring around the entire periphery of the latter to support the eye ring during the clinching or bending thereof, as will later appear.

Embracing the holder 50 is a sleeve 54 having adjacent its upper end an outwardly extending radial flange 55. The oppositely threaded ends of adjusting studs 56 are threaded into the flange 55 and the plate 37, respectively, to suspend the supporting sleeve 54 from the plate. By means of the studs 56 the sleeve 54 may be shifted vertically on the sleeve-like holder 50 and locking nuts 57 are provided to retain the parts in adjusted position. Around the lower portion of the sleeve 54, and preferably integral therewith, are a multiplicity of equally spaced radiating legs or elements 58, providing therebetween radial slots or grooves 59 which receive fingers or levers 60 pivoted on still balls 61. These balls are of greater diameter than the width of the slots 59 and the walls of the slots are recessed as indicated at 64 to provide passages for the balls. The balls are seated in recesses 62 formed in the inner edges of the levers 60 and bear against the sleeve 54 at the inner ends of the recesses 64. Each of the fingers 69 is formed with an arcuate bearing surface 65 concentric with the ball 61, and a thrust ring 66 seated against the underside of projections 67 on the radial leg elements 58 engages the arcuate surfaces 65 of the fingers to hold the latter within the slots 59. The ring 66 may be held in place by frictional engagement with radial ends 68 of the legs 58.

Disposed about the sleeve 54 is an actuating ring 70, the inner surface of which has sliding engagement with the projections 57 on the leg elements 58 and is guided thereby. An inwardly directed flange 71 on the ring slides over the end surfaces 68 of the leg elements. The sleeve 54 with the legs 58 and the embracing ring 70 thus constitute a cage-like structure for supporting the pivoted levers or fingers 60. Vertical or axial movement of the ring 70 relative to the sleeve 54 actuates or pivots all of the levers 60 simultaneously, as will later appear.

Rods 72 (three in number) secured to cross member 73 carried between the upper ends of the columns 1 and 2 extend downwardly through openings 74 in the movable cross member 40 and at their lower ends are secured to radial ear flanges 75 formed on the ring 70 to rigidly support the latter in fixed relation relative to the columns 1 and 2.

Figure 10:
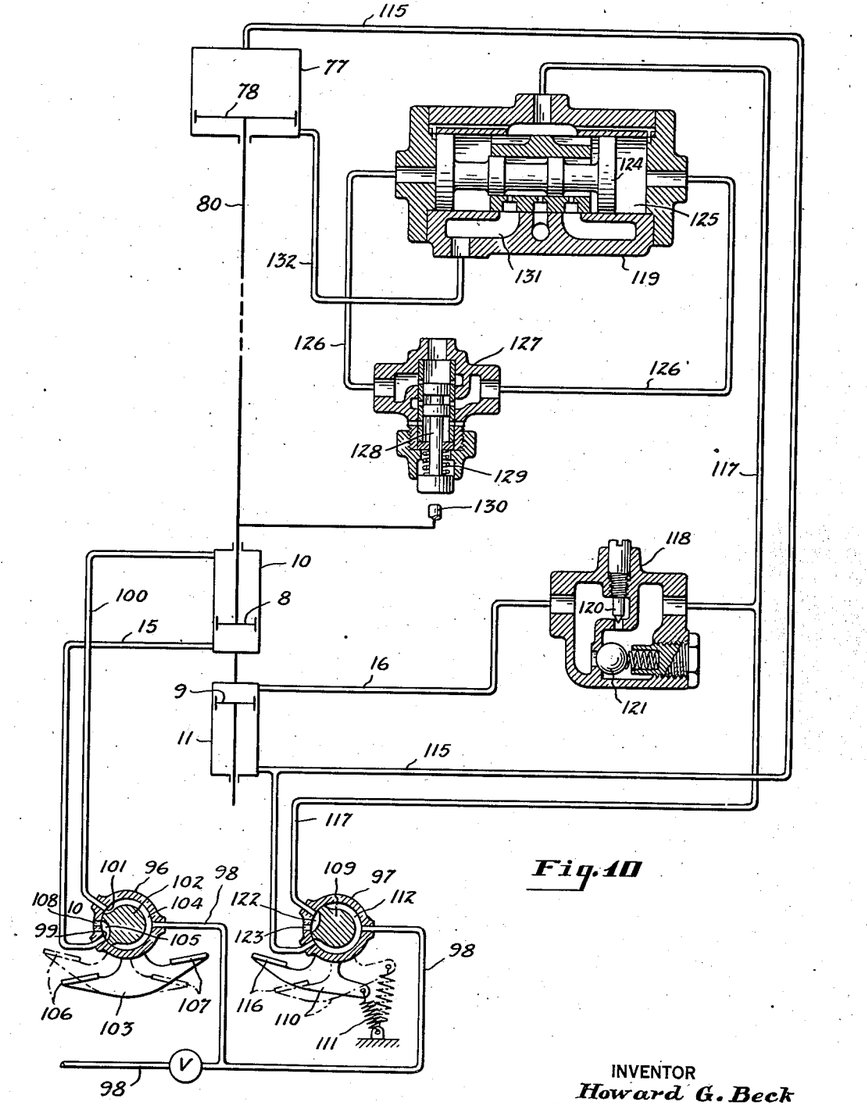
Fig. 10 is a diagrammatic illustration of the fluid actuating mechanism of the apparatus showing the control valves and their connections.

A cylinder 77 having therein a pneumatic or fluid actuated piston, diagrammatically indicated at 78, Fig. 10, is supported by means of members 79 on the cross member 73. The piston 78 is connected by a rod 80 to a flanged element 81 bolted or otherwise secured to the movable cross member 40. Thus, the piston 78 is arranged to shift or move the sleeve 54 vertically to thereby move the fingers 60 relative to the actuating ring 70. Upward movement of the fingers brings outer edges 82 along the lower ends of the fingers into bearing engagement with the ring flange 71, thus pressing the lower ends of the fingers inwardly around the entire periphery of the sleeve 54. Lateral or inward projections or extensions 83 on the lower ends of the fingers 60 are formed with horizontal and vertical shoulders 84 and 85 that engage and bend inwardly tabs 86 formed along lower marginal edge of eye ring 87 while continuous marginal edge 88 of the eye ring is engaged and supported by working face 51 of the holder 50.

Downward movement of the fingers 60 relative to the actuating ring 70 carries outwardly curved edges 89 along the upper ends of the fingers against the upper edge corner of the ring 70 to thereby swing the lower ends of the fingers 60 and the extensions 83 radially outwardly or away from the clinched eye ring.

Figures 4, 4A:
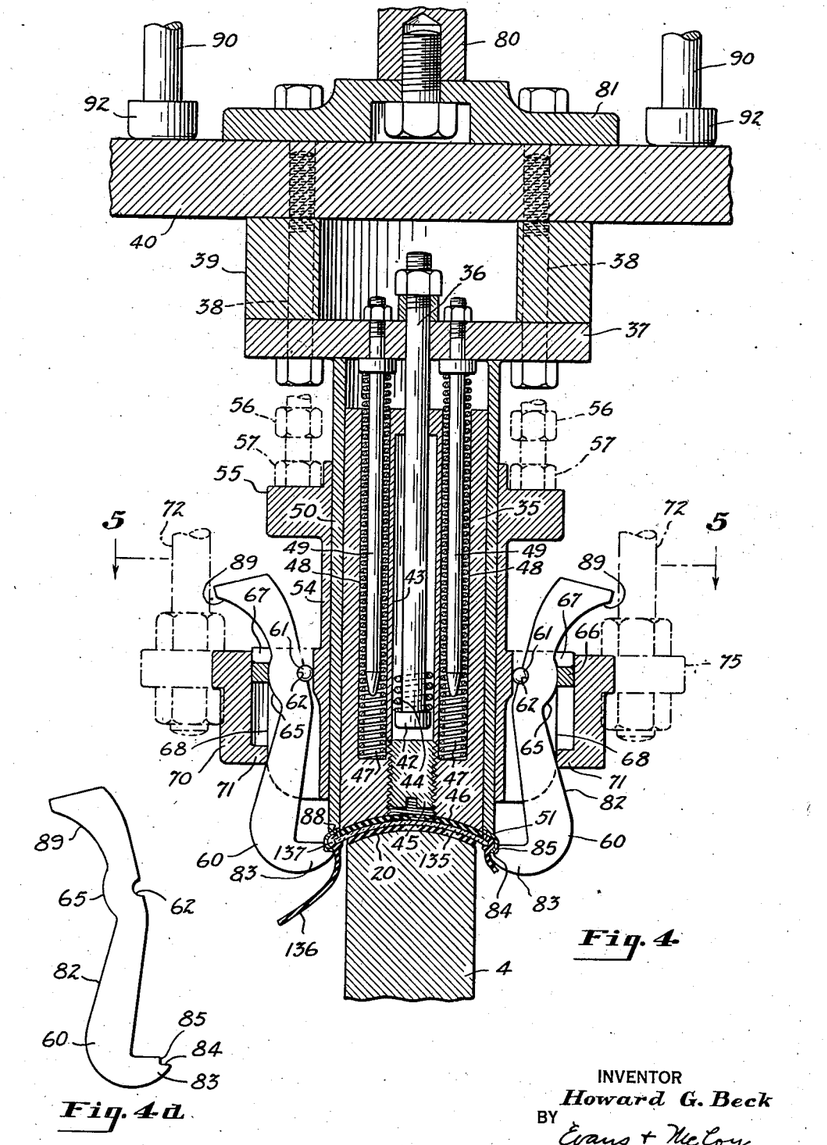
Fig. 4 is a vertical sectional detail with parts removed, taken substantially on the line indicated at 4—4 of Fig. 5.
Fig. 4a is an elevational detail showing one of the following fingers.

Vertical movement of the cross member 40 is limited by rods 90 and 91. The rods 90 (three in number), Fig. 4, are secured to the cross member 73 and have heads 92 that engage the upper side of the cross member 40, while the rods 91 (three in number), Fig. 2, are secured to the cross member 73 and extend downwardly through openings 93 in the movable cross member 40 and are provided with heads 94 that engage the underside of the cross member 40 to limit the downward movement of the latter.

The operation of the apparatus is controlled by foot valves 96 and 97 which receive high pressure air or fluid from a suitable source of supply (not shown) through conduits 98. The lower end of cylinder 10 is connected by conduit 15 to a port 99 communicating with the interior of the valve 96, while the upper end of the cylinder 10 is connected by a conduit 100 to a port 101 communicating with the interior of the same valve. Rotor body 102 is operably connected to a double treadle 103 and is formed with circumferential channels 104 and 105. By stepping on the left hand pad 106 of the treadle 103, the operator moves the valve rotor to the position shown so that high pressure fluid in the upper end of cylinder 10 from the conduit 100 lowers or holds the first clamping member or ram 4 in the lens receiving or neutral position shown in Figs. 1, 2 and 11, and from which the mask assembling or eye ring clinching operation is started. The treadle 103 is arranged by friction or otherwise to remain in the full line positon shown until pressure on right hand pad 107 moves the treadle to the broken line position shown, placing the conduit 15 in communication through the channel 104 with the high pressure fluid conduit 98, thereby supplying fluid to the lower end of cylinder 10 to raise the piston 8 and the ram or first clamping member 4 to the first operating position shown in Fig. 12. The treadle 103 remains in the broken line position shown so that the rod 7 is held extended from the cylinder 10 and the ram or first clamping member is held in the first operating position. Retraction of the piston rod 7 is effected by stepping on the pad 106 to lower the piston 8 by fluid pressure. When the piston 8 is raised or lowered, the air or fluid above or below the same and within the cylinder is exhausted through the conduits connected to the cylinder and the channel 11 which communicates with an exhaust port 108 in the valve 96.

The valve 97 has a rotary valve body 109 actuable by a treadle 110. A spring 111 having connection with the treadle 110 normally holds the valve body 109 so that a circumferential channel 112 in the valve body connects the high pressure conduit 98 with conduits 115, having connection with the bottom and top of the cylinders 11 and 77, respectively. Thus, the piston 9 is normally retracted into the upper end of the cylinder 11 while the piston 78 is normally held in the lower end of the cylinder 77 by the air or fluid pressure in the cylinders admitted through the conduits 115. In these positions of the pistons 9 and 78, and with the rod 7 projected from the cylinder 10, the parts of the apparatus are in the positions shown in Fig. 12.

Pressure on pad 116 of the treadle 110 moves the latter to the broken line position shown in Fig. 10, thereby rotating the valve body 109 and placing the high pressure fluid conduit 98 in communication with branched conduits 117 through the circumferential channel 112 in the valve body. The conduits 117 are connected to a speed control valve 118 and a so-called master control valve 119. The speed control valve 118 supplies high pressure air or fluid through an orifice controlled by an adjustable valve pin or needle 120 to the conduit 16, previously mentioned, connected to the upper end of the cylinder 11. In this manner the assembly of cylinders 10 and 11 guided by the cross member 12 is raised to the second operating station or position shown in Fig. 14, moving through the intermediate station or position shown in Fig. 13. By adjustment of the valve pin 120, the rate of flow of fluid or air into the cylinder 11 through the conduit 16 and the speed of travel of the first clamping member or ram 4 between the first and second operating positions or stations can be adjusted as desired.

When pressure on the treadle 110 is released, the spring 111 returns the valve body to the full line position shown in Fig. 10 and the inflowing high pressure air entering the bottom of the cylinder 11 raises the piston 9 therein. The exhaust air flows through the conduit 16, through the ball check valve 121 in the valve 118 and thence through the conduit 117 to the interior of the valve 97, where a circumferential passage 122 in the valve body 109 releases the exhaust air or fluid to the atmosphere through an outlet port 123.

The master control 119 is of conventional construction and includes a reciprocable piston 124 mounted in a cylinder chamber 125. The ends of the chamber 125 are connected by conduits 126 to a so-called two-way bleeder valve 127 having a piston 128. A spring 129 in the bleeder valve 127 normally holds the piston 128 in such position that high pressure air or fluid is released from the left hand end of the master control valve 119, as viewed in Fig. 10, while air or fluid is trapped in the right hand end of the master control valve. Thus, the piston 124 is retained in the position shown in Fig. 10, which prevents the flow of air through the valve 119.

A rod 130 secured in vertical position to the cross member 5 and guided at 131 is engageable with the lower end of the piston 128 of the bleeder valve 127 to shift the piston to release air from the right hand end of the master control valve 119, thus causing the piston 124 of the valve 119 to move to the right and allow high pressure air or fluid to flow through the passage 131 and into a conduit 132 connected to the lower end of the cylinder 77. The rod 130 is adjusted to actuate the bleeder valve 127 after the movement of the pistons 8 and 9 in the cylinders 10 and 11 have raised the clamping members or rams to approximately the intermediate station or position illustrated in Fig. 13. At this intermediate station or position the eye ring 87 is disposed in bearing relation against the working surface 51 of the holder 50. High pressure fluid admitted through the master valve 119 to the lower end of the cylinder 77 at the instant the eye ring is disposed against the holder 50 immediately and automatically commences the raising of the movable cross member 40 so that the fingers 60 are actuated to engage and bend inwardly the eye ring tabs 86. While the clinching or bending operation takes place there is a slight upward movement of the sleeve 54 and holder 50 under the influence of the air or fluid pressure in the cylinder 77, but the sustained fluid pressure in the cylinders 10 and 11 retains the ram or first clamping member 4 resiliently pressed against the work, so that the ram follows the movement of the holder 50 and the ring 54.

While the parts or members of the apparatus are disposed in the neutral or starting position as illustrated diagrammatically in Fig. 11, a lens 35 (shown in plane form in Fig. 9) is placed on the rubber cushion 20 on the upper end of the lower ram or first clamping member 4. The rubber cushion frictionally engages the underside of the lens and the latter is embraced by the upper marginal edge of the band 19 of the retainer and thereby centered or correctly located on the lower clamping member.

The eye ring 87 is placed or threaded over the upper ram or second clamping member 35 with the tabs or teeth 86 directed downwardly and is held thereon by frictional engagement with the sides of the ram. The eye ring is preferably stamped from relatively thin spring-like material such as brass and grips the sides of the ram by reason of being sprung or bent slightly to draw the sides thereof together.

The mask or face blank to which the lens is to be attached may be of any conventional construction. Fig. 6 illustrates one type of gas mask that may be assembled by the machine of the present invention. This mask is integrally formed of rubber, as by a molding operation, and is indicated generally by the numeral 136. Eye openings are formed in the mask and include thickened ring-like frames 137 that may be provided with a peripherally inwardly directed groove to receive the edge of the lens 135. The mask is threaded onto the upper ram or clamping member 35 beneath the positioned eye ring 87 with the outside of the mask uppermost, toward the eye ring 87. Preferably the cross sectional area of the eye opening in the mask is slightly less than that of the ram 35, so that the rubber ring framing the eye opening is slightly distended by the ram, thereby supporting the mask or face blank on the ram by frictional engagement therewith.

Figure 12:
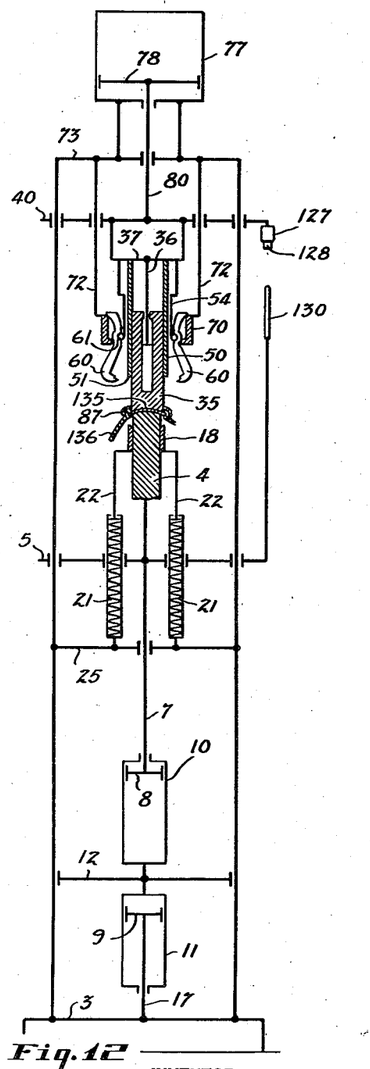
Figure 13:
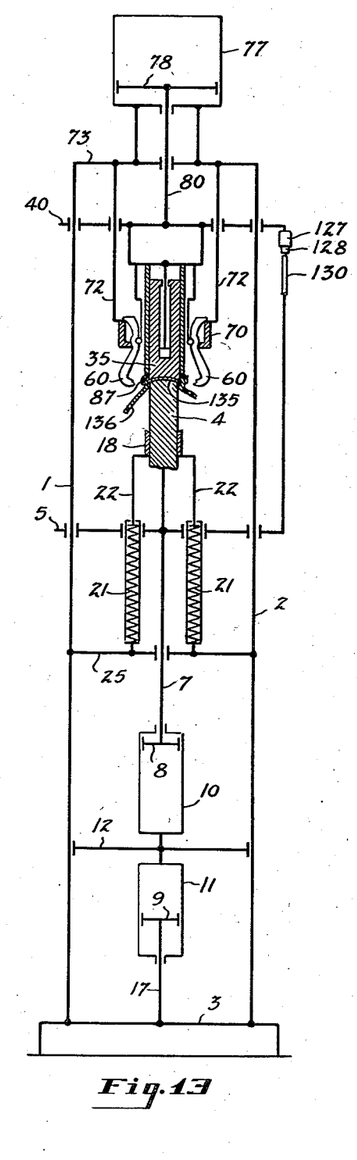

Upon depressing the tread 107 of the treadle 103, high pressure fluid is admitted to the bottom of cylinder 10, thereby raising the bottom ram or clamping member 4 from the neutral or starting position and moving the same to the first operating position shown in Fig. 12. During the raising of the member 4 the retainer 18 is raised by the springs 21, thereby keeping the lens 135 in proper position on the rubber friction element 20 until the upper surface of the lens is engaged by the rubber friction element 46 on the bottom of the upper ram or clamping member 35. The lens carried by the bottom ram 4 engages the rubber facing on the lower end of the upper ram 35 before the bottom ram reaches the first operating station or position, its limit of movement under the influence of the piston 8.

Before the ram or clamping member 4 completes its upward movement toward the first operating station, and after the lens 135 is engaged by the upper clamping member, the rods 22 reach the limit of their movement in the tubes 24, thereby arresting the upward movement of the retainer 18. Accordingly, when the lens 135 is tightly held between the confronting rubber facings of the rams at the first operating station, as shown in Fig. 12, the retainer 18 is relatively withdrawn therefrom so that the entire peripheral edge of the lens is unobstructed and projects beyond the sides of both the upper and the lower clamping members. The operator then draws the mask 136 downwardly and fits the eye frame portion 137 of the mask around the free edge of the lens. As previously mentioned, the eye frame 137 is formed with an inwardly directed groove which receives the edge of the lens, but, if desired, a rubber eye frame of conventional flanged construction may be employed. The eye ring 87 is next brought downwardly to overlie the rubber frame embracing the edge of the lens, as shown in Fig. 12, or it may be allowed to remain in the position shown in Fig. 11; in the latter case the eye ring will be moved to embracing relation around the rubber eye frame during the succeeding operation of the machine.

The operator then depresses the tread 116 of the treadle of the valve 97 to admit high pressure fluid into the upper end of the cylinder 11 through the speed control valve 118 and the conduit 16 previously mentioned. Thus the cylinder 11 is raised on the piston 9 to lift the assembly of the cylinders 10 and 11 and to raise the ram 4 to the second operating position. During this movement of the ram 4 the upper ram or clamping member 35 is forced into the sleeve-like holder 50 to the retracted position shown in Figs. 4 and 13. This action takes place by the pressure of the bottom ram or clamping member 4 on the underside of the lens 135 and against the force or resistance of the springs 47. While the axially aligned rams or clamping members 4 and 35 are moving to the second operating position, the rod 130 engages and actuates the piston of the bleeder valve 127, thereby operating the master control valve 119 to admit high pressure fluid into the lower end of the cylinder 77 through the conduit 132. The resulting upward movement of the piston 78 in the cylinder 77 draws the movable cross member 40 upwardly, thereby synchronously raising the holder 50 and the sleeve 54 carrying the folding fingers or elements 60. During this upward movement of the sleeve-like holder 50, the pressure maintained in the cylinders 10 and 11 keeps the ram or clamping member 4 pressed tightly against the underside of the lens 135 so that the latter continues to press the eye ring 87 against the working face 51 of the holder 50. In this connection it is to be noted that as an important feature of the present invention the rams or clamping members 4 and 35 have a floating or yielding action relative to the holder 50, so that the clamped lens 135 accommodates itself to the position of the eye ring 87.

Upon engagement of the flange 71 of the actuating ring 70 with the backs of the fingers 60 and during continued upward movement of the sleeve 54 relative to the ring 70, the fingers are forced inwardly against the bottom peripheral edge of the eye ring 87 to fold such end inwardly under the edge of the clamped lens.

As previously mentioned, the peripheral edge of the eye ring 87 that is to be bent around the lens edge is formed with a plurality of tabs or teeth 86 which may be made by forming radial notches or slots 138 in the eye ring. These tabs 86 are preferably equal in number to the folding fingers or elements 60 so that during the folding or clinching operation each tab or tooth is individually engaged by one of the fingers and the bending of all of the tabs occurs simultaneously around the entire periphery of the eye ring.

Figure 14:
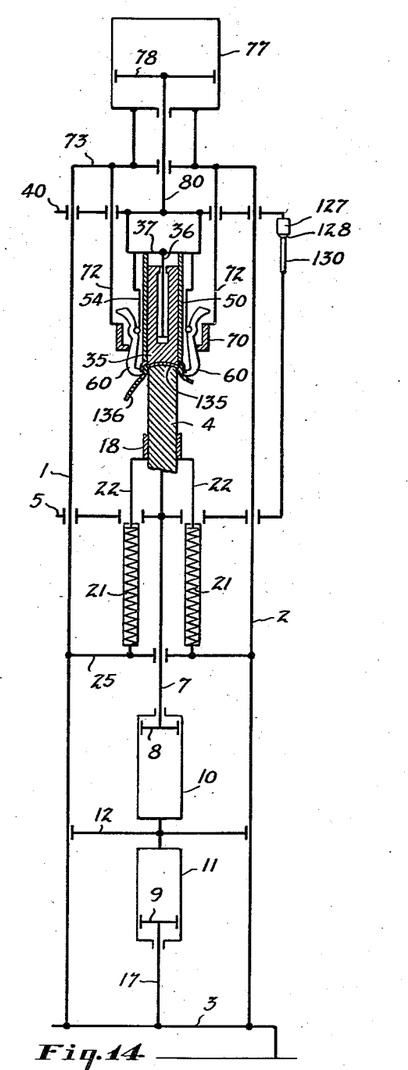

At the completion of the clinching operation the parts of the apparatus are disposed as shown in Fig. 14. During the entire assembling operation, including the bringing together of the rubber frame of the mask and the metal eye ring in embracing relation around the lens edge and the clinching of the metal eye ring about the edge of the lens with the rubber eye frame disposed therebetween, the lens is held against lateral shifting or displacement by the frictional engagement of opposite sides of the lens by the rubber face pieces 20 and 46 secured to the confronting ends of the rams or clamping members 4 and 35, respectively. Furthermore, the rubber face pieces 20 and 46 serve to protect the lens during the assembling operation to prevent scratching or marring thereof.

The engagement of the upper clamping member or ram 35 with the inner peripheral edge 139 of the eye ring 87 holds the latter in predetermined position relative to the lens 135 during assembling of the parts and until after the completion of the clinching operation, preventing lateral shifting of the eye ring relative to the lens.

When the clinching operation is finished the operator relieves the pressure from tread 116 of the treadle 110 so that the spring 111 operates the valve 97 to admit air or fluid pressure to the top of the cylinder 77, which lowers the movable cross member 40 and the sleeve 54, thereby bringing the curved edges 90 of the fingers 60 against the actuating ring 70. In this manner the fingers are simultaneously retracted from the clinched eye ring, releasing the latter to be removed with the mask assembly upon retraction of the bottom ram or clamping member 4, which immediately occurs due to the introduction of high pressure fluid into the bottom of cylinder 11. The operator then applies pressure to the tread 106 of the treadle 103 to admit high pressure fluid into the upper end of the cylinder 10 to return the bottom clamping member 4 to the neutral or starting position shown in Fig. 11. Thus, the apparatus is in readiness to receive another lens and repeat the cycle of operations on the other eye opening of the same mask or to secure the received lens in a different mask.

The principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim is:

1. In eye ring clinching apparatus of the character described having aligned work clamping members normally disposed in separated relation and means guiding the members for rectilinear movement along a common axis, said members being adapted to clamp a lens with a marginal portion of the lens exposed, means for first relatively moving the members together to clamp the lens therebetween in a stationary first operating position to receive a bendable eye ring in engagement with the exposed margin of the lens and for then moving the members in unison to carry the clamped lens with the eye ring in engagement therewith along said axis to a second operating position, and means at said second operating position for bending one edge portion of the received eye ring about the clamped lens to secure the same to the lens.

2. In eye ring clinching apparatus of the character described having aligned work clamping members normally disposed in separated relation and means guiding the members for rectilinear movement along a common axis, means for first relatively moving the members together to clamp a lens therebetween in a position to receive a bendable eye ring and for then moving the members in unison to carry the clamped lens and the received eye ring along said axis, means for engaging one edge of the eye ring to hold the same against the lens, and members engageable with the outer edge of the ring and movable transversely of said axis for bending the eye ring about the clamped lens while the eye ring is held against the lens.

3. In apparatus of the character described, a first work clamping member and means mounting the same for yielding movement, a second work clamping member and means mounting the same for movement from a work receiving position toward and against the first clamping member to displace the latter, a retainer embracing the second clamping member and engageable with the edge of the work to position the latter with respect to the second clamping member, means for moving the retainer with the second clamping member while the latter moves against the first clamping member, and means for arresting the movement of the retainer during said displacement whereby the continued movement of the second clamping member removes the work from the retainer.

4. In apparatus of the character described, a member for holding the work while the latter is being operated upon, a first clamping member for receiving a lens, a second clamping member adjacent the holding means, engageable with the lens inwardly of its margin and adapted to position a ring with respect to the exposed margin of the lens, means for supporting and actuating the clamping members to move together to first clamp the lens therebetween and to then move in unison to position the lens and ring in bearing relation against the holding member, and actuable means supported adjacent the holding member for pivotal movement toward and away from the latter to bend one edge of the ring over the lens periphery.

5. In apparatus of the character described, a member for holding the work while the latter is being operated upon, a first clamping member for receiving a lens, a second clamping member adjacent the holding means, engageable with the lens inwardly of its margin and adapted to position a ring with respect to the exposed margin of the lens, means for supporting and actuating the clamping members to move together to first clamp the lens therebetween and to then move in unison to position the lens and ring in bearing relation against the holding member, a plurality of pivotally mounted fingers disposed for movement toward and away from the holding member, and means for simultaneously actuating the fingers to bend one edge of the ring over the lens periphery.

6. In apparatus of the character described, a work holder in the form of a sleeve having a continuous work engaging end, a first elongated member movable interiorly of the holder and having one end projectable beyond said work engaging end of the holder, the projecting portion of said member being shaped to receive an eye ring and having an end face shaped to engage a lens inwardly of its margin, a second elongated member movable against said one end to clamp the lens therebetween, and means for moving the second member into engagement with the first to clamp the lens, then moving said first and second members in unison relative to the work holder to hold the ring and lens against said continuous end of the work holder.

7. In apparatus of the character described, a work holder in the form of a sleeve having a continuous work engaging end, a first elongated member movable interiorly of the holder and having one end projectable beyond said work engaging end of the holder, the projecting portion of said member being shaped to receive an eye ring and having an end face shaped to engage a lens inwardly of its margin, a second elongated member movable against said one end to clamp the lens therebetween, means for moving the second member into engagement with the first to clamp the lens, then moving said first and second members in unison relative to the work holder to hold the ring and lens against said continuous end of the work holder, and actuable means movable toward and away from the continuous end of the work holder to bend one edge of the ring over the lens periphery.

8. In apparatus of the character described, a work holder in the form of a sleeve having a continuous work engaging end, a first elongated member movable interiorly of the holder and having one end projectable beyond said work engaging end of the holder, a projecting portion of said member being shaped to receive an eye ring and having an end face shaped to engage a lens inwardly of its margin, a second elongated member movable against said one end to clamp the lens therebetween, means for moving the second member into engagement with the first to clamp the lens, then moving said first and second members in unison relative to the work holder to hold the ring and lens against said continuous end of the work holder, a plurality of fingers and means mounting the same in a ring about the sleeve, and means for simultaneously actuating the fingers to bend one edge of the ring over the lens periphery.

9. Apparatus for clinching a bendable ring about the edge of a lens comprising means for receiving the ring and supporting the same around its entire inner periphery, a holder disposed to engage one side of the supported ring around the entire extent of the latter, means for clamping the lens and pressing the same against the supported ring and the holder, a plurality of fingers disposed in a ring about the holder, and means for simultaneously actuating the fingers to move against the supported ring to bend one edge of the latter over the lens periphery.

10. Apparatus for clinching a bendable ring about the edge of a lens comprising means for receiving the ring and supporting the same around its entire inner periphery, a holder disposed to engage one side of the supported ring around the entire extent of the latter, means for clamping the lens and pressing the same against the supported ring and the holder, and members engageable with the outer edge of the ring and movable inwardly over the outer margins of the lens to bend the outer edge of the ring around the edge of the lens simultaneously around the entire periphery of the lens, said clamping means being yieldable in a direction normal to the lens to permit movement of the latter in said direction during the bending while being rigidly supported to resist lateral shifting of the lens.

11. Apparatus for bending an eye ring over the edge of a lens comprising support means receivable within the ring to resist lateral shifting thereof, holding means for engaging and backing up the ring during the bending thereof, clamping means and yieldable support means therefor to hold a lens in bearing relation against a supported ring, a plurality of fingers and a cage-like structure for supporting the fingers in a ring around the support and the holding means, and means for relatively moving the fingers and a member of the structure to draw the latter over the fingers and thereby press the fingers against one edge of a supported ring to bend such edge about a clamped lens.

12. A mask assembling device comprising a supporting structure, a member movable on the structure and having a sleeve-like holder attached thereto, said holder having a working face at one end to engage an eye ring during clinching of the latter, a spring pressed clamping member slidable in the holder and formed to receive an eye ring, said clamping member having a lens contacting surface at one end, another clamping member and means guiding the same for movement in the same direction as the slidable clamping member, means for supporting and retaining a lens on one end of said other clamping member, means for moving the other clamping member to a first operating position in which a supported lens is yieldingly engaged by said surface, means for moving said other clamping member to a second operating position in which the slidable clamping member is retracted within the holder and the face of the latter engages an eye ring embracing the edge of a supported lens, a plurality of folding fingers, and means movable over the backs of the fingers to simultaneously press the same against an engaged eye ring to bend the latter around the lens embraced thereby.

13. In eye ring clamping apparatus of the character described having aligned work clamping members normally positioned in separated relation and means guiding the members for rectilinear movement along a common axis, said members being adapted to clamp a lens with a marginal portion of the lens exposed, one of said members being receivable within a bendable eye ring and shaped to engage the latter at a number of points and thereby position the eye ring in predetermined relation to the lens, means for first relatively moving the members together to clamp a lens therebetween in a position to receive the bendable eye ring in engagement with the exposed margin thereof and for then moving the members in unison to carry the clamped lens with the eye ring thereon along said axis, a sleevelike holder on said eye ring receiving member engageable with the eye ring inwardly of its outer margin to hold the same against the lens, and means engageable with the outer marginal portion of the ring for bending one edge portion of the eye ring about the clamped lens.

14. Apparatus for clinching a bendable ring about the edge of a lens comprising clamping members engageable with opposite faces of a lens inwardly of its periphery, one of said members being shaped to enter the opening of a bendable eye ring and to position the same upon the projecting margin of the lens clamped between said members, a sleevelike holder surrounding the eye ring receiving member and adapted to engage the ring inwardly of its margin to hold said ring against the projecting marginal portion of a side face of said lens, and members engageable with the outer edge of the ring and movable inwardly toward the center of the ring for bending said outer edge of the ring inwardly over the periphery of the lens.

15. Apparatus for clinching a bendable ring about the edge of a lens comprising clamping members having opposed faces covered with cushioning material and engageable with opposite faces of a lens inwardly of its periphery, one of said members being shaped to enter the opening of a bendable eye ring and to position the same upon the projecting margin of the lens clamped between said members, a holder surrounding the eye ring receiving member and adapted to hold said ring against the projecting marginal portion of a side face of said lens, and members engageable with the outer edge of the ring and movable inwardly toward the center of the ring for bending said outer edge of the ring inwardly over the periphery of the lens.

HOWARD G. BECK.